United States Patent [19]

Aubry et al.

[11] Patent Number: 4,626,207
[45] Date of Patent: Dec. 2, 1986

[54] APPARATUS FOR HOLDING A GLASS SHEET IN A SUBSTANTIALLY VERTICAL POSITION DURING HEAT TREATMENT OF THE GLASS SHEET

[75] Inventors: Claude Aubry; Jacques Chaumette; Bernard Letemps, all of Thourotte; Jean-Marc Petitcollin, Le Plessis-Brion, all of France; Werner Gatzweiler, Heineberg; Heinz-Bernd Rissmann, Aachen, both of Fed. Rep. of Germany; Luc Vanaschen, Eupen, Belgium; Jürgen Zeitzen, Herzogenrath, Fed. Rep. of Germany

[73] Assignee: Saint Gobain Vitrage, Courbevoie, France

[21] Appl. No.: 775,717

[22] Filed: Sep. 16, 1985

Related U.S. Application Data

[63] Continuation of Ser. No. 610,787, May 16, 1984, abandoned.

[30] Foreign Application Priority Data

May 16, 1983 [FR] France ........................... 83 08044

[51] Int. Cl.⁴ .................. F27D 5/00; C03B 23/02; C03B 27/00

[52] U.S. Cl. ................................. 432/253; 65/289; 65/348

[58] Field of Search .............. 432/253; 65/289, 114, 65/351; 269/217, 297; 211/41; 248/317

[56] References Cited

U.S. PATENT DOCUMENTS

| | | | |
|---|---|---|---|
| 2,134,797 | 11/1938 | Owen | 65/349 |
| 2,537,803 | 1/1951 | Walters | 65/273 |
| 2,618,905 | 11/1952 | Dicks et al. | 248/317 |
| 3,220,818 | 11/1965 | Barch et al. | 65/289 |
| 3,298,809 | 1/1967 | Barch et al. | 65/106 |
| 3,392,006 | 7/1968 | Seymour | 65/114 |
| 3,606,443 | 9/1971 | Painter et al. | 294/106 |
| 4,353,728 | 10/1982 | Slabach et al. | 65/289 |

Primary Examiner—John J. Camby
Attorney, Agent, or Firm—Pennie & Edmonds

[57] ABSTRACT

A frame for holding a glass sheet in a substantially vertical position. The frame has two uprights joined by upper and lower crosspieces. A lower support means adapted to engage a bottom edge of a glass sheet is carried by the lower crosspiece. Upper support means freely movable in a vertical direction are adopted to engage the upper edge of the glass sheet and form part of the frame.

6 Claims, 5 Drawing Figures

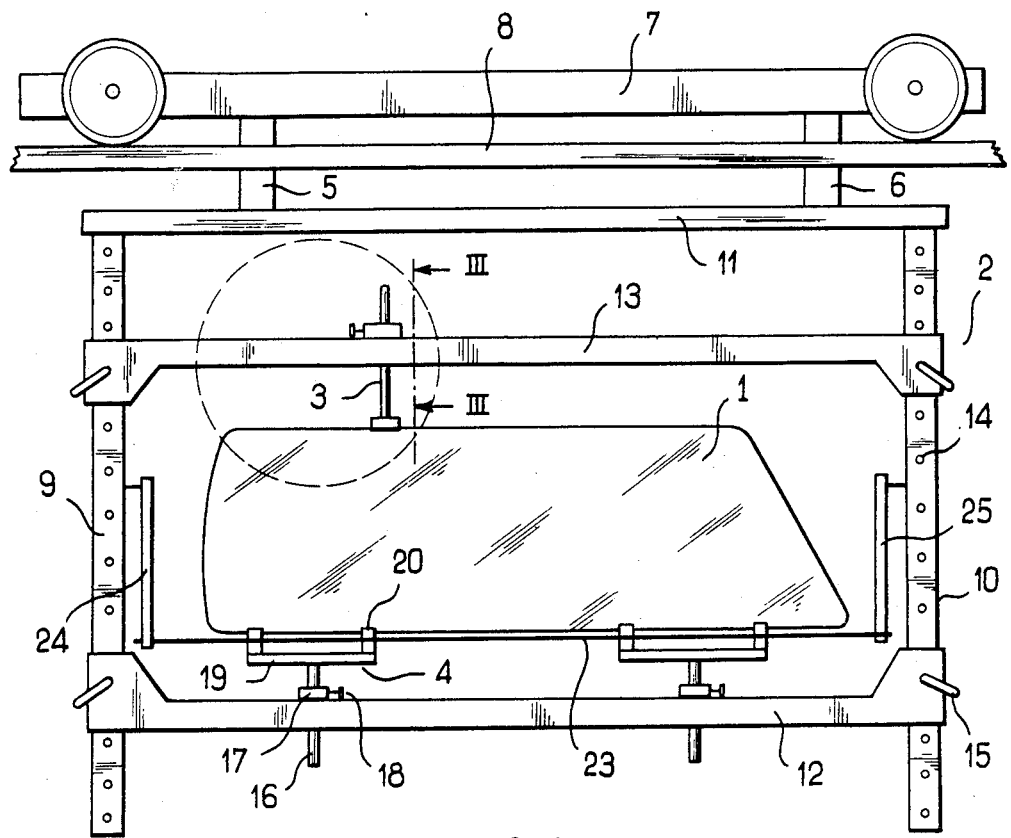
FIG_1
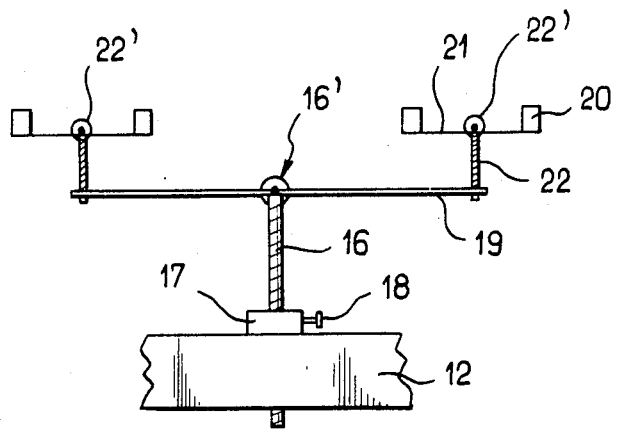
FIG_2

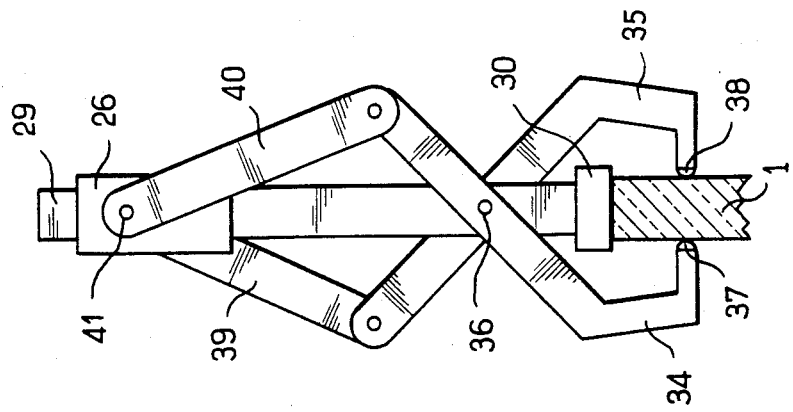
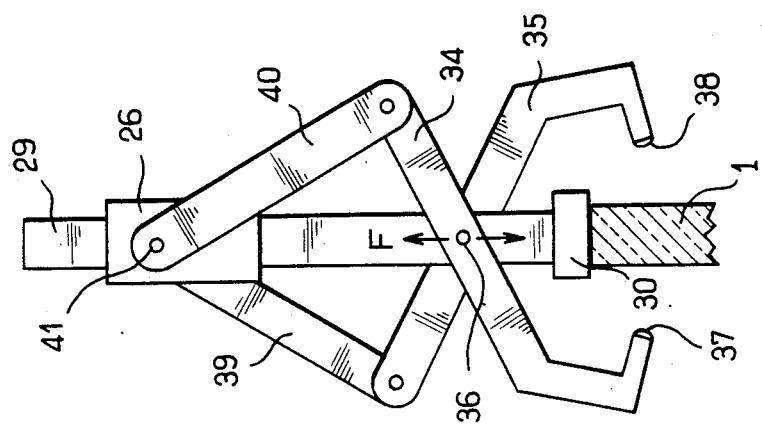
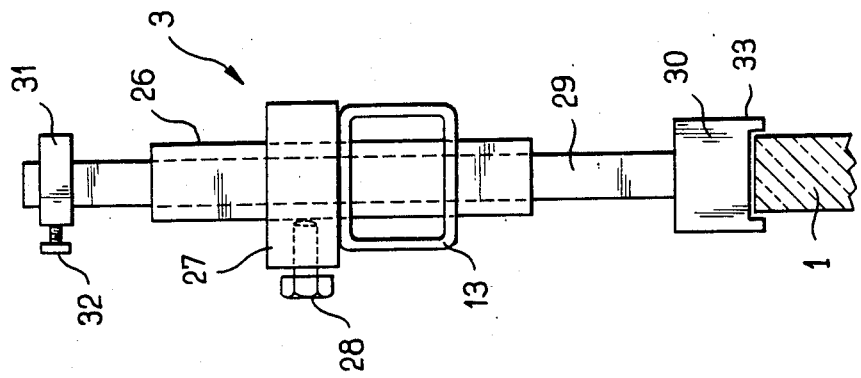

APPARATUS FOR HOLDING A GLASS SHEET IN A SUBSTANTIALLY VERTICAL POSITION DURING HEAT TREATMENT OF THE GLASS SHEET

This is a continuation of application Ser. No. 610,787, filed on May 16, 1984, now abandoned.

FIELD OF THE INVENTION

This invention relates to a frame for holding glass sheets in a vertical or near vertical position during various heat treatment processes, as for example, heating for bending or tempering sheets, and for carrying sheets through and between various treatment stations.

BACKGROUND OF THE INVENTION

Frames for supporting or holding glass sheets during tempering operations have been proposed where the sheets rest on their lower edges on a crosspiece of a frame and the sheets are held laterally at their upper parts by pairs of catches, as disclosed in U.S. Pat. No. 2,618,905, or by a support rod working with locking parts, as disclosed in U.S. Pat. No. 3,298,809.

These means for holding the upper parts of the sheets, namely the catches or support rod, are of a relatively small size so as not to interfere with treatment of the sheets with the result that the sheets may become loose from the catches or support rod, such that they are no longer held by the frame and thus fall from the frame. Such looseness may result from the sheets losing their rigidity due to overheating and sagging under their own weight.

It is therefore an object of our invention to provide for a frame which will eliminate sheets falling from a frame and to hold sheets in a substantially vertical position even when the sheets sag or bend.

GENERAL DESCRIPTION OF THE INVENTION

Broadly a frame constructed according to our invention has two uprights and lower and upper crosspieces joining the uprights. A lower support means is on the lower crosspiece and is adapted to receive a lower edge of a glass sheet while upper support means are adapted to engage an upper edge of the glass sheet. The upper support means are freely movable in a substantially vertical direction in guide means which extend in a substantially vertical direction such that the upper support means will continue to contact the upper edge of a glass sheet even in case the sheet looses it rigidity and sags or bends.

Preferably the upper support means comprises a piston having a piston rod which is slidable in a sleeve surrounding the rod and where the sleeve serves as the guide means. By this construction, the piston will continue to contact or engage the upper edge of the sheet under the effect of its own weight notwithstanding any sagging or bending of the sheet. It is not necessary to provide the upper support means with vertically oriented lugs to hold the sheets laterally. However, such lugs can be provided, if desired, on the upper support means to reinforce the holding of the sheets. If the sheets are held only by engagement of the upper support means with the upper edge of a sheet, the lateral or side faces of the sheets will not be contacted by any structure of the holding means which might interfere with treatment of the sheets or approach of treatment equipment close to the sheets.

Preferably each piston comprising the upper support means has tongs thereon the jaws of which will engage the sides of a sheet when the piston is lowered. Thus when the upper edge of a glass sheet drops due to the sheet sagging, the piston will also drop closing the tongs to clamp on the upper portion of the sheet to keep the sheet from falling out of this frame. When such a pair of tongs is used, the two legs of the pair are pivoted on a pin carried by the piston and the end of each leg opposite a jaw is fastened to an arm with both arms in turn pivotable about a common pin fixedly positioned with respect to the frame.

The sleeve acting as a guide means for each upper support means is preferably adjustable in a vertical direction with respect to the upper crosspiece to accommodate glass sheets of various heights.

The lower support means preferably comprises two U-shaped pins carried by a vertically adjustable platform. The pins are pivotable about a vertically extending rod carried by the platform and both the platform and pins are freely rotatable in a substantially vertical plane.

The frame further may be provided with a horizontally extending adjustment rule carried by two arms connected to the uprights. The rule moves down under gravity forces to contact and align the U-shaped support pins.

BRIEF DESCRIPTION OF THE DRAWINGS

FIG. 1 is a side view of a frame constructed according to the invention having upper and lower support means supporting a glass sheet;

FIG. 2 is an enlarged view of a further embodiment of a lower support means;

FIG. 3 is an enlarged view of the upper support means of FIG. 1 taken along lines III—III;

FIG. 4 is an enlarged view of an upper support means having a piston contacting an upper edge of a glass sheet; and showing the tongs in open position; and FIG. 5 is an enlarged view of a support means having a pair of tongs in an closed position.

DESCRIPTION OF THE PREFERRED EMBODIMENT

Referring to FIG. 1, there is illustrated a carrying frame 2 holding a glass sheet 1 by way of an upper support means 3 and a lower support means 4. Frame 2 is attached by lugs 5 and 6 onto a carriage 7 movable on rails 8 in order that the frame and glass sheet may be transported to various treatment rotatories, as for example, a bending rotation and a tempering rotation contained in a glass heating furnace.

Frame 2 is made up of heat-resistant metal elements including two uprights 9 and 10, an upper crosspiece 11 and a lower crosspiece 12 joining the two uprights. Preferably a further intermediate crosspiece 13 is vertically adjustably positioned between crosspiece 11 and 12. In addition the lower crosspiece 12 is also vertically adjustably positioned with respect to the uprights. Adjustment of both the crosspieces 12 and 13 may be accomplished by having a series of holes 14 at different heights in the uprights through which keys 15 may be inserted to position the crosspieces on the uprights. In this manner, the frame can be adapted to different heights for different size glass sheets.

Lower support means 4 are carried by lower crosspiece 12 to support the glass sheet and each lower support means comprises support pins 20 engaging a lower edge of the sheet. The pins 20 may be positioned directly on the crosspiece 12, or preferably as shown in FIGS. 1 and 2, onto a horizontally extending rod 19 which is adjustable vertically with respect to the crosspiece 12. Rod 19 is fastened at its middle to a vertically extending rod 16 which is slidable in a substantially vertical direction in a bore contained in the crosspiece 12 and which may be locked in a fixed vertical position by a ring 17 held to the rod 16 by locking screw 18. Support pins 20 as shown are U-shaped and are carried on the ends of rod 19 such that a glass sheet may be inserted between the legs of the U-shaped pins. Preferably each rod 16 is free to pivot in the bore of the crosspiece 12 even when the rod is locked in a vertical position of the locking screw 18.

In order that the lower support means 4 may obtain a closer conformity with the contour and profile of the lower edge of the sheet, additional degrees of freedom of movement of the pins 20 may be provided as shown in FIG. 2. In this instance a platform 21 carries a support pin 20 at each end. The platform 21 is mounted for free swinging movement in a vertical plane on a horizontally extending pin 22 carried on the end of a vertically extending rod 22 which in turn is carried by rod 19 and free to pivot with respect thereto. Further, rod 19 may also swing freely in a vertical plane around a horizontally extending pin 16 carried by the upper end of rod 16.

The lower support means 4 thus described constitutes a "swing tray" in which all the horizontally extending elements may swing in a vertical plane and in which all the vertically extending elements may pivot. In order to facilitate placement of a glass sheet on the "swing tray" the amplitude of the various swinging movements and pivoting movements may be limited.

In order to aid in the alignment of the support pins 20 when a glass sheet is initially placed in the frame, a horizontally extending rule 23 is provided. Rule 23 is connected to uprights 9 and 10 by arms 24 and 25 which are free to swing in a vertical direction. The length of the arms 24 and 25 is such that rule 23 tends to move into the plane of the frame 2 and contact pins 20 as the arms swing down under the force of gravity. When the pins 20 move out of alignment after a glass sheet has been positioned in its frame, or for example as may occur when the sheet is bent, the pins will be forced against the rule 23 causing it to swing outwardly of the plane of the frame.

Upper support means 3 as shown in FIG. 1 is fastened to the intermediate crosspiece 13. Crosspiece 13 may comprise a tube having a square cross-section containing vertically extending bores by which the support means may be fastened to the crosspiece.

The support means 3 comprises a cylinderical sleeve 26, as shown in FIGS. 3–5, which is slidable in one of the bores contained in the crosspiece 13 and which can be locked into a desired vertical position by a ring 27 which in turn is locked to the sleeve by a locking screw 28. A piston rod 29 is guided in the sleeve 26 and has a piston 30 adapted to contact the upper edge of a glass sheet. Rod 29 is free to slide in sleeve 26 and its downward movement with respect to the sleeve 26 is limited by an adjustable stop ring 31 which is locked to the rod 29 by a locking screw 32.

Piston 30 may be provided with spaced projections 33 extending downwardly so as to fit over the upper edge of a glass sheet in order to enhance supporting the sheet in a lateral direction. The projections 33 should in each instance be small so as not to interfere with treatment of the sheet.

In addition, the lower face of the piston adapted to contact the upper edge of a sheet may have a roughened surface to promote support of the sheet when the piston contacts the edge by a force dependent on the weight of the piston and its piston rod 29.

If there is a danger that a glass sheet will bend or sag beyond normal limits, as may occur by an overly hot furnace or from an overly extended dwell time in the furnace, tongs may be associated with the piston rod 29 which will be close to grasp the sheet if the upper edge of the sheet comes out of contact with the piston, otherwise the tongs remain open and out of contact with the sheet.

As shown in FIGS. 4 and 5, each piston 30 has associated with it a pair of tongs having legs 34 and 35 pivoted about a common pin 36 mounted on the piston rod 29. The ends of the tongs terminate in jaws 37 and 38 of a standard material able to grasp a glass sheet and capable of resisting temperatures on the order of 600°–700° C. without deterioration or oxidation. As shown pin 36 which extends through the rod 29 will move vertically along with the rod in two directions denoted by double arrow F. In the alternative, the pin 36 may be fastened to any vertically movable part of the support means 3, including the piston 30 or the rod 29.

The end of the legs 34 and 35 opposite the jaws 37 and 38 are pivotably connected to one end of arms 39 and 40 which in turn are each pivotably connected to a stationary pin 41 mounted on sleeve 26.

The dimensions of the several parts making up the tongs are such that the tongs are open when the piston is in a position contacting an upper edge of a glass sheet. Further the parts are proportioned so that the jaws extend below the upper edge of a sheet even when the piston associated with the tongs engages the upper edge of the sheet. Thus in the event the tongs become jammed in an open position or otherwise do not function normally, they will be in a position to provide lateral holding or stability to a sheet in the event the upper edge of the sheet sinks out of contact with the pistons.

Preferably in order to facilitate bending of a glass sheet, the lower support means 4 and upper support means 3 are positioned in crosspieces 12 and 13 at points where the glass sheet will intersect the plane of the frame 2.

To further promote support of a bent glass sheet, the upper support means 3 may be fastened to intermediate crosspiece 13 by "swing trays" similar to the lower support means shown in FIG. 2. The "swing trays" when used with the upper support means would be inverted from those shown in FIG. 2. While jaws 20 would be directed downwardly in such an instance, they nevertheless will support the upper edge of a glass sheet. Still it would be preferable that the pins be replaced by the piston structures shown in FIG. 3 and the piston-tong structures shown in FIGS. 4 and 5. If for any reason the glass sheet slides downwardly, as shown in FIG. 5, piston 30 will also move downwardly under its own weight and that of the tongs to remain in contact with the upper edge of the sheet. Pin 36 will also move downwardly to cause the tongs to close since pin 41 remains fixed with respect to the sleeve 26. Closure of the tongs will cause the jaws 37 and 36 to lock onto the sheet of glass after which the piston 30 may no longer descend since it will be held in position by arms 39 and 40 and legs 34 and 35.

A frame constructed as described allows a sheet to be carried into a furnace where it is brought to a high temperature and to move to a bending station where the sheet may be bent along horizontal and/or vertical axes since the upper and lower support means may move in various directions while continuing to contact upper and lower edges of the sheet.

Further in normal operations and barring any accident, the faces of the glass sheet are not in contact with the support means thus they will not mark the faces. In the event of accident, as may occur from abnormally high furnace temperatures or too long a stop in a furnace, resulting in sag of the sheet, the piston will follow the sag and continue to engage and support the upper edge of the sheet. If the sheet continues to sag further, the tongs are available to grasp the sheet to prevent its falling and possibly damaging a treatment station or at least littering the station with broken glass.

We claim:

1. In an apparatus for holding a glass sheet in a substantially vertical position having two upright members, a lower crosspiece member and an upper crosspiece member, said crosspiece members joining said upright members, and lower support means on said lower crosspiece member adapted to receive a lower edge of said glass sheet, the improvement comprising upper support means located on said upper crosspiece member which comprises:

piston means capable of reciprocating movement in a substantially vertical direction for contacting an upper edge of said glass sheet;

guide means extending in a substantially vertical direction through an aperture defined by said upper crosspiece member for allowing rotational or substantially vertical movement of said piston means; and means for contacting the sides of said glass sheet operatively associated with said piston means and said guide means, and constructed in a manner such that said contacting means normally remains in an open position, removed from said glass sheet, said open position of said contacting mens corresponding to a raised position of said piston means, and said contacting means assuming a closed position in contact with the sides of said sheet when said piston means moves to a lower position due to a corresponding movement of the upper edge of said glass sheet from bending or sliding of said glass sheet.

2. The apparatus of claim 1 wherein said upper support means further comprises locking means for adjustably positioning said guide means in a substantially vertical direction.

3. The aparatus of claim 1 wherein a lower face of said piston means is provided with a roughened surface to promote support of said glass sheet.

4. The apparatus of claim 1 wherein said guide means is sleeve means.

5. The apparatus of claim 1 wherein said means for contacting the sides of said glass sheet are tong means.

6. The apparatus of claim 5 wherein said tong means comprises two leg members, each of said leg members being pivotable about pin means mounted on said piston means, each leg member having a jaw on one end thereof and an arm connected on an opposite end thereof with each arm being pivotable about common pin means located on said guide means.

* * * * *